United States Patent [19]

Cohen

[11] Patent Number: 4,638,636

[45] Date of Patent: Jan. 27, 1987

[54] FUEL NOZZLE

[75] Inventor: Joseph D. Cohen, Danvers, Mass.

[73] Assignee: General Electric Company, Lynn, Mass.

[21] Appl. No.: 625,745

[22] Filed: Jun. 28, 1984

[51] Int. Cl.⁴ .......................... F02C 1/00; F02G 3/00

[52] U.S. Cl. .......................................... 60/741; 60/748

[58] Field of Search ......................... 60/740, 741, 748; 239/533.2, 533.4, 533.7, 533.9, 533.13, 533.14

[56] References Cited

U.S. PATENT DOCUMENTS

| | | | |
|---|---|---|---|
| 465,013 | 12/1891 | Bourdil | 239/533.14 |
| 1,589,245 | 6/1926 | Scott | 239/533.14 X |
| 2,144,874 | 1/1939 | Edwards | 239/533.9 X |
| 2,168,839 | 8/1939 | Edwards | 239/533.9 X |
| 2,965,311 | 12/1960 | Gascoigne | 239/533.2 X |
| 3,039,699 | 6/1962 | Allen . | |
| 3,057,560 | 10/1962 | Campbell | 239/533.2 X |
| 3,234,731 | 2/1966 | Dermody et al. . | |
| 3,253,789 | 5/1966 | Witte | 239/533.13 |
| 3,288,447 | 11/1966 | Withers et al. . | |
| 3,302,399 | 2/1967 | Tini et al. | 60/740 |
| 3,589,127 | 6/1971 | Kenworthy . | |
| 3,912,164 | 10/1975 | Lefebvre . | |
| 4,296,887 | 10/1981 | Hofmann | 239/533.2 X |
| 4,305,255 | 12/1981 | Davies et al. . | |
| 4,407,128 | 10/1983 | Kwan | 60/748 X |
| 4,418,543 | 12/1983 | Faucher et al. . | |
| 4,425,755 | 1/1984 | Hughes | 60/748 X |

FOREIGN PATENT DOCUMENTS

| | | |
|---|---|---|
| 565999 | 12/1944 | United Kingdom . |
| 815174 | 6/1959 | United Kingdom . |
| 857725 | 1/1961 | United Kingdom . |
| 1003320 | 9/1965 | United Kingdom . |
| 1185252 | 3/1970 | United Kingdom . |

*Primary Examiner*—Carlton R. Croyle
*Assistant Examiner*—Timothy S. Thorpe
*Attorney, Agent, or Firm*—Francis L. Conte; Derek P. Lawrence

[57] ABSTRACT

A fuel nozzle including a hollow body having an inlet, an outlet and a stationary surface are disclosed. Means for modulating fuel flow from the inlet to the outlet are also disclosed and comprise a flexible pressure-responsive diaphragm fixedly mounted in the body and having a freely supported edge disposed adjacent to the body stationary surface for defining therebetween a discharge port. The flow area of the discharge port is increasable in response to increasing fuel pressure in the inlet as fuel pressure acts against the diaphragm to displace the edge away from the body stationary surface.

9 Claims, 2 Drawing Figures

FUEL NOZZLE

BACKGROUND OF THE INVENTION

This invention relates generally to fuel nozzles and, more specifically, to a variable area fuel nozzle for use in a gas turbine engine.

A gas turbine engine operates from start up to maximum power and requires relatively low fuel flowrates to relatively high fuel flowrates, respectively. Various types of fuel nozzles are known in the prior art for suitably providing fuel to a combustor of the engine. Conventional fuel nozzles include, for example, those types defined as simplex, duplex, dual orifice, variable port, spill or return, and pintle. These various conventional fuel nozzles are of varying complexity and performance, and attempt to provide optimum fuel atomization and flow characteristics under the various power settings of the engine.

Furthermore, a conventional fuel nozzle is typically designed for operating with only a particular class of fuels. However, in a land vehicle gas turbine engine, for example, the ability to operate using alternate fuels can be desirable; for example, a vehicular engine capable of operating on liquid fuels such as diesel or gasoline. However, the use of gasoline in a vehicular engine having conventional fuel nozzles can result in boiling of the fuel under low-power operation when the engine is relatively hot. Boiling of the fuel would adversely affect operation of the engine.

Accordingly, an object of the present invention is to provide a new and improved fuel nozzle for a gas turbine engine.

Another object of the present invention is to provide a relatively simple fuel nozzle having only one moving part.

Another object of the present invention is to provide a variable area fuel nozzle.

Another object of the present invention is to provide a fuel nozzle having a variable restriction discharge port for maintaining fuel pressure above the fuel vapor pressure for preventing boiling thereof.

SUMMARY OF THE INVENTION

According to an exemplary embodiment of the invention, a fuel nozzle including a hollow body having an inlet, an outlet and a stationary surface are provided. Means for modulating fuel flow from the inlet to the outlet are also provided and comprises a flexible pressure-responsive diaphragm fixedly mounted in the body and having a freely supported edge disposed adjacent to the body stationary surface for defining therebetween a discharge port. The flow area of the discharge port is increasable in response to increasing fuel pressure in the inlet as fuel pressure acts against the diaphragm to displace the edge away from the body stationary surface.

BRIEF DESCRIPTION OF THE DRAWINGS

The novel features believed characteristic of the invention are set forth in the appended claims. The invention, itself, together with further objects and advantages thereof is more particularly described in the following detailed description taken in conjunction with the accompanying drawings in which:

DETAILED DESCRIPTION

Figure 1:
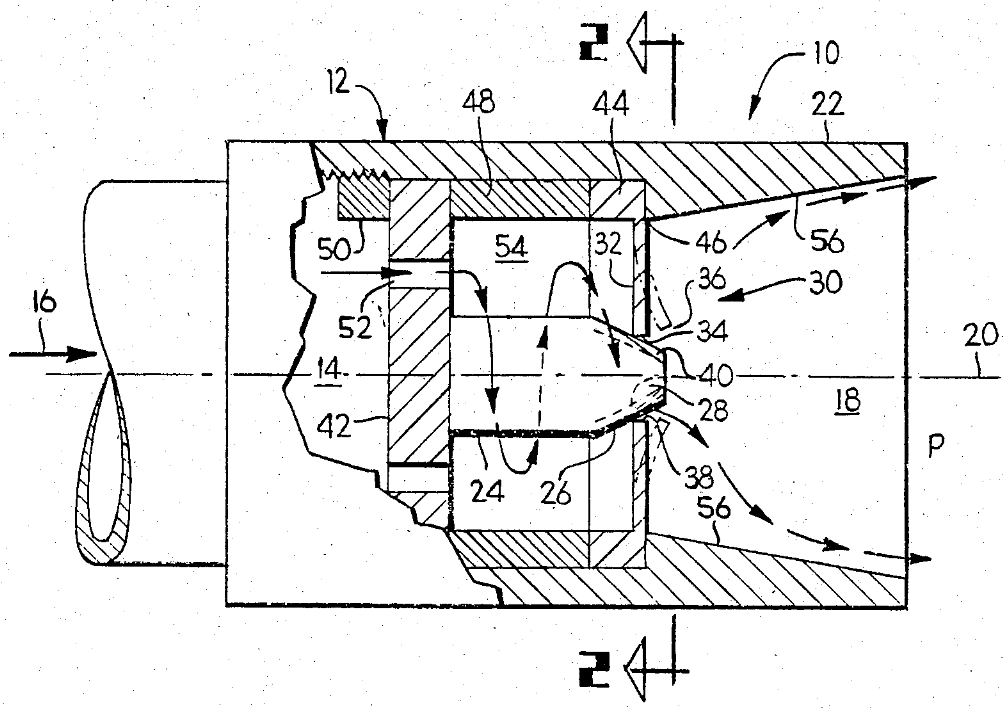
FIG. 1 is a sectional view of a fuel nozzle according to an exemplary embodiment of the invention.
Figure 2:
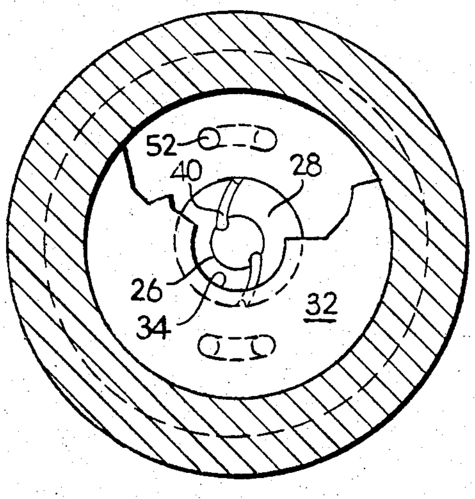
FIG. 2 is a sectional end view of the nozzle illustrated in FIG. 1 taken along line 2—2.

Illustrated in FIGS. 1 and 2 is an exemplary embodiment of a fuel nozzle 10 according to the present invention. The use of a fuel nozzle in a gas turbine engine is conventional. For example, the fuel nozzle 10 may be used in a gas turbine engine of the type as shown in U.S. Pat. No. 3,589,127 to M. J. Kenworthy, et al, entitled "Combustion Apparatus," assigned to the present assignee and incorporated herein by reference. Accordingly, the details of the fuel nozzle 10 only shall be hereinafter described.

The fuel nozzle 10 includes a generally cylindrical hollow body indicated generally at 12 which has a fuel inlet 14 effective for receiving pressurized fuel 16 from a fuel pump (not shown). The hollow body 12 also includes a fuel outlet 18, which along with the inlet 14 are disposed coaxially about a longitudinal centerline 20 of the nozzle 10.

The hollow body 12 comprises an outer casing 22 and a centerbody 24 spaced radially inwardly therefrom. The centerbody 24 includes a downstream conical end 26 which decreases in diameter in a downstream direction. The centerbody conical end 26 of the body 12 includes a stationary annular outer surface 28.

Means for modulating fuel flow, indicated generally at 30, from the inlet 14 to the outlet 18 is provided and includes an elastically flexible, self-actuating, pressure-responsive metallic diaphragm 32 suitably fixedly mounted in the casing 22. The diaphragm 32 has a freely supported edge 34, which in this embodiment of the invention is defined by a central orifice 36 of the diaphragm 32. The edge 34 is disposed adjacent to the conical end outer surface 28 for defining therebetween a discharge port 38.

In the embodiment of the invention illustrated, the diaphragm 32 has an initially unloaded, first position wherein the edge 34 is disposed directly in contact with the outer surface 28. In order to provide a minimum flow area for the discharge port 38, a tangentially angled groove 40, and preferably two grooves 40 disposed 180 degrees to each, are provided in the conical outer surface 28 (see FIG. 2). The grooves 40 are preferably straight but may be curved.

The diaphragm 32 is predeterminedly designed in size and material properties so that the central orifice 36 is displaced away from the conical outer surface 28 in response to increasing pressure of the fuel 16 which will act against the diaphragm 32 to thereby increase the flow area of the discharge port 38. In the illustrated preferred embodiment, the diaphragm 32 comprises a Belleville-type washer, which is effective for operating in substantially only two positions to ensure that all of a plurality of such nozzles 10 used in the gas turbine engine are operating with substantially identical discharge flow areas. Predetermined, substantially fixed discharge flow areas matched among the plurality of nozzles is preferred and might not otherwise occur where a continuously variable diaphragm 32 were used due to differences in manufacturing tolerances, for example.

The two operating positions of the diaphragm 32 include: a first position as shown wherein the discharge port 38 has a minimum flow area which includes that of the grooves 40, and a second position (shown in dashed line) wherein the discharge port 38 has a maximum flow area. The diaphragm 32 is sized so that the first position is maintainable for relatively low fuel pressures (e.g., idle and low-power engine operation requiring little fuel), and upon reaching an intermediate pressure, the diaphragm 32 will pop into the second position and remain there for relatively high pressures (e.g. intermediate to maximum power engine operation requiring substantial quantities of fuel). Of course, the diaphragm 32 may be sized so that the area of the discharge port 38 varies continuously in response to increasing pressure of the fuel pump 16.

The centerbody 24 also includes an annular end flange 42 extending radially outwardly from an upstream end thereof to the inner surface of the casing 22 for fixedly mounting the centerbody 24 in the casing 22. As illustrated in FIG. 1, the diaphragm 32 includes an outer perimeter 44 which is disposed against a shoulder 46 of the casing 22. An annular sleeve 48 is disposed between the centerbody end flange 42 and the diaphragm outer perimeter 44. An annular retaining ring 50 is suitably secured, for example, by screw threads, in the casing 22, for pressing the end flange 42 in turn against the sleeve 48, the diaphragm outer perimeter 44 and the casing shoulder 46 for fixedly mounting these elements to the casing 22.

The end flange 42 includes at least one and preferably two tangentially angled inlet ports 52 in flow communication with the casing inlet 14. The centerbody 24, including the flange 42, the casing 22, and diaphragm 32 define therebetween a swirl chamber 54. The fuel 16 received from the inlet 14 through the inlet port 52 is channeled through the inlet ports 52 to thereby swirl in the chamber 54. Inasmuch as the tangentially disposed grooves 40 are also provided in the discharge port 38 and the discharge port 38 is in flow communication with the chamber 54, the fuel 16 is caused to additionally swirl upon leaving the discharge port 38.

The outlet 18 of the hollow body 12 and casing 22 includes a frusto-conical inner surface 56 extending from adjacent the diaphragm 32 and increasing in diameter in the downstream direction. The inner surface 56 receives the swirled fuel 16 from the discharge port 38, and in cooperation with the inlet port 52, the chamber 54, and the discharge port 38 is effective for channeling the fuel 16 in a generally conical hollow fuel spray pattern from the outlet 18 about the centerline 20.

It will be appreciated that the fuel nozzle 10 including the fuel modulating means 30 provides a relatively simple variable area fuel nozzle having a single moving element, i.e., diaphragm 32. In the exemplary embodiment illustrated, the fuel nozzle 10 is effective also for providing a variable flow restriction at the discharge port 38.

More specifically, as fuel 16 is channeled through the inlet port 52 and into the swirl chamber 54, the discharge port 38 when positioned in the first position provides a flow restriction due to the minimum flow area thereof. This will allow the pressure of the fuel 16 to be maintained within the swirl chamber 54. For example, when liquid fuel such as gasoline is used and when the engine operates under low-power conditions where the combustion gas pressure P at the nozzle outlet 18 is relatively low, and the fuel temperature is relatively high, boiling of the fuel 16 can be avoided inasmuch as the flow restriction at the discharge port 38 is effective for maintaining the pressure of the fuel 16 above its vapor pressure. Without a flow restriction in this mode of operation, the fuel 16 would more freely flow from the discharge port 38 and where the combustion pressure P is less than the fuel vapor pressure, the pressure of the fuel 16 would drop below the vapor pressure and boiling would occur.

However, during elevated power operation of the engine, the combustion gas pressure P increases to well above the fuel vapor pressure, and it will be effective for maintaining adequate fuel pressure within the swirl chamber 54 to prevent boiling. During this elevated power operation of the engine, the diaphragm 32 is positioned in its second, less flow restrictive position thusly increasing the flow area of the discharge port 38 while reducing the resistance to flow.

Accordingly, it will be appreciated to those skilled in the art from these teachings that the fuel nozzle 10 according to the present invention is effective for obtaining good performance under varying engine operations requiring differing amounts of fuel. In particular, the fuel modulating means 30 is effective for obtaining increased fuel flowrates without undesirably high fuel pressures which would otherwise be needed in a fixed geometry-type fuel nozzle. Furthermore, flow restriction is provided at relatively low fuel flowrates and pressures where it is desirble, but flow restriction is reduced at relatively high fuel flowrates and pressures where it is undesirable.

Accordingly, both variable area and variable restriction are provided by the fuel nozzle 10 in a preferred cooperation with engine operating modes and, of course, with acceptable fuel atomization throughout the engine operating range requirements.

While there has been described herein a preferred embodiment of the invention, other embodiments will be apparent to those skilled in the art from the teachings herein. For example, although the diaphragm 32 is fixedly mounted at the outer perimeter 44 and includes the central orifice 36 cooperating with the conical end 26, an alternate embodiment may include an imperforate diaphragm 32 fixedly mounted at a central portion thereof with the outer perimeter 44 being freely supported against the conical surface 56. Accordingly, an increase in pressure of the fuel 16 in such a combination would displace the outer perimeter 44 of the diaphragm 32 for defining a variable area discharge port. However, although this alternate embodiment allows for fuel swirl, the rate or tangential velocity of this swirl will be significantly less than that obtainable through the discharge port 38 of the preferred embodiment illustrated in FIG. 1, which is due to the difference in radii of the corresponding discharge ports.

Having thus described the invention, what is desired to be secured by Letters Patent of the United States:

1. A fuel nozzle comprising:

a hollow body having an inlet, an outlet and a stationary surface;

means for modulating fuel flow from said inlet to said outlet comprising a flexible pressure-responsive diaphragm fixedly mounted in said body and having an edge disposed adjacent to said body stationary surface and defining therebetween a discharge port, said port having a flow area being increasable in response to increasing fuel pressure in said inlet as said fuel pressure acts against said diaphragm to displace said edge away from said body surface; and wherein said diaphragm is sized and configured for operating in substantially only two positions: a first position wherein said discharge port has a minimum flow area and a second position wherein said discharge port has a maximum flow area, said first position being maintainable for relatively low fuel pressures and upon reaching a predetermined intermediate pressure said diaphragm being allowed to pop into said second position, said second position being maintainable for relatively high fuel pressures.

2. A fuel nozzle according to claim 1 wherein said diaphragm in said first position is effective for providing a flow restriction at said discharge port so that fuel pressure in said body is maintainable at a value higher than the vapor pressure of said fuel to prevent boiling thereof.

3. A fuel nozzle according to claim 1 wherein said hollow body comprises an outer casing and a centerbody spaced radially inwardly therefrom; said centerbody including a downstream conical end having an outer surface defining said body stationary surface, and said diaphragm includes an outer perimeter fixedly mounted to said casing and a central orifice defining said edge and cooperating with said conical end to define said discharge port.

4. A fuel nozzle according to claim 3 wherein said centerbody further includes an end flange at an upstream end thereof for fixedly mounting said centerbody to said casing, and wherein said casing, said flange, said centerbody and said diaphragm define a chamber, said flange including a tangential inlet port in flow communication with said body inlet, said discharge port providing flow communication from said chamber to said body outlet, and said chamber being effective for allowing fuel to be swirled from said inlet port to said discharge port.

5. A fuel nozzle according to claim 4 wherein said centerbody conical end includes a tangential groove disposed therein that defines a portion of said discharge port and is effective for swirling fuel discharged into said body outlet.

6. A fuel nozzle according to claim 5 wherein said body outlet comprises a frusto-conical inner surface extending from adjacent said diaphragm and increasing in diameter in a downstream direction, and wherein said inlet port, said chamber, and said discharge port are effective for swirling fuel about a longitudinal centerline of said nozzle for generating a hollow conical swirling fuel spray pattern along said frusto-conical surface and out said nozzle.

7. A fuel nozzle comprising:

an outer casing having a longitudinal centerline, an inlet, and an outlet;

an elongated centerbody spaced radially inwardly from said casing and coaxially with said centerline, said centerbody having an annular end flange disposed at an upstream end thereof for fixedly mounting said centerbody to said casing, said flange having an inlet port in flow communication with said casing inlet, said centerbody further having a downstream conical end decreasing in diameter in the downstream direction;

means for modulating fuel flow from said inlet to said outlet comprising a flexible pressure-responsive diaphragm having an outer perimeter fixedly mounted to said casing and a central orifice disposed adjacent to and coaxial with said centerbody conical end and defining a discharge port therebetween, said discharge port having a flow area being increasable in response to increasing fuel pressure in said inlet as said fuel pressure acts against said diaphragm to displace said central orifice away from said centerbody conical end; and wherein said diaphragm is sized and configured for operating in substantially only two positions: a first position wherein said discharge port has a minimum flow area and a second position wherein said discharge port has a maximum flow area, said first position being maintainable for relatively low fuel pressures and upon reaching a predetermined intermediate pressure said diaphragm being allowed to pop into said second position, said second position being maintainable for relatively high fuel pressures.

8. A fuel nozzle according to claim 7 wherein said flange, centerbody, casing, and diaphragm define an annular chamber in flow communication with said inlet port and said outlet port, said inlet port being tangentially disposed for swirling fuel in said chamber, said centerbody conical end including a tangential groove disposed therein for swirling fuel through said discharge port, and said casing outlet including a frusto-conical inner surface increasing in diameter in a downstream direction, whereby fuel is swirlable through said chamber and said casing outlet for generating a substantially uniform hollow conical fuel flow spray pattern.

9. A plurality of fuel nozzles for a gas turbine engine, each comprising:

a hollow body comprising an outer casing and a centerbody spaced radially inwardly therefrom; said hollow body having an inlet, an outlet and a stationary surface;

means for modulating fuel flow from said inlet to said outlet comprising a flexible pressure-responsive diaphragm fixedly mounted in said body and having an edge disposed adjacent to said body stationary surface and defining therebetween a discharge port, said port having a flow area being increasable in response to increasing fuel pressure in said inlet as said fuel pressure acts against said diaphragm to displace said edge away from said body surface;

wherein said diaphragm is sized and configured for operating in substantially only two positions: a first position wherein said discharge port has a minimum flow area and a second position wherein said discharge port has a maximum flow area, said first position being maintainable for relatively low fuel pressures and upon reaching a predetermined intermediate pressure said diaphragm being allowed to pop into said second position, said second position being maintainable for relatively high fuel pressures; and whereby all of said plurality of fuel nozzles are operable with substantially identical discharge port flow areas.

* * * * *